United States Patent [19]

Nonaka et al.

[11] 4,227,799

[45] Oct. 14, 1980

[54] IMAGE FORMING APPARATUS

[75] Inventors: Kohei Nonaka, Yokohama; Masahiro Koyama, Kawasaki; Makoto Gonmori, Tokyo; Takeo Kimura; Tetsuo Shiga, both of Fuji, all of Japan

[73] Assignee: Asahi Kasei Kogyo Kabushiki Kaisha, Osaka, Japan

[21] Appl. No.: 63,310

[22] Filed: Aug. 2, 1979

[30] Foreign Application Priority Data

Aug. 8, 1978 [JP] Japan .................................. 53-97134
Aug. 10, 1978 [JP] Japan .................................. 53-97989

[51] Int. Cl.³ ........................ G03B 27/32; G03B 27/52
[52] U.S. Cl. .......................................... 355/27; 355/45
[58] Field of Search ........................ 355/27, 28, 44, 45, 355/100

[56] References Cited

U.S. PATENT DOCUMENTS

| | | | |
|---|---|---|---|
| 3,372,617 | 3/1968 | Pfaff | 355/27 X |
| 3,475,095 | 10/1969 | Norton et al. | 355/27 |
| 3,585,917 | 6/1971 | Griffith | 355/27 X |
| 3,697,173 | 10/1972 | Sasaki et al. | 355/27 |
| 3,797,932 | 3/1974 | Endter et al. | 355/27 X |
| 3,945,727 | 3/1976 | Nakajima et al. | 355/27 |
| 4,116,559 | 9/1978 | Morokuma et al. | 355/28 |

*Primary Examiner*—Richard A. Wintercorn
*Attorney, Agent, or Firm*—Sughrue, Rothwell, Mion, Zinn and Macpeak

[57] ABSTRACT

In image forming apparatus using a heat-developable image forming sheet which is normally non-photosensitive but can be rendered photosensitive by preheating and is exposed to a light image to form a latent image and then heat-developed to produce a visible image, first heating means for preheating, exposure means for exposing the image forming sheet to the light image and the second heating means for heat development are respectively provided with fixing means for respectively fixing different image forming areas of the sheet at the processing positions of the respective means, and the first and second heating means and the exposure means are arranged so that the different image forming areas can be simultaneously processed by the respective means in parallel.

21 Claims, 20 Drawing Figures

IMAGE FORMING APPARATUS

BACKGROUND OF THE INVENTION

This invention relates to image forming apparatus which uses an image forming sheet of such a characteristic that it is rendered photosensitive by preheating prior to exposure, forms a latent image by exposure to a light image and then produces a visible image by heat development.

There has heretofore been known an image forming sheet which is rendered photosensitive by heat activation and which can form thereon a visible image in the photosensitive area by exposure to a light image and then by heat development. This image forming sheet requires neither the wet process for development nor the provision of a dark room for loading on and unloading from image forming apparatus, and can be handled in a light room.

According to the arrangement of such image forming apparatus, it is also possible that after information is once selectively recorded in a desired frame of the image forming sheet, the image forming sheet can be loaded again on the image forming apparatus for additionally recording information in other frames of the sheet.

This invention has for its object to provide image forming apparatus which permits handling of the image forming sheet in a light room, and hence is simple-structured, and permits recording and development of information on the image forming sheet by the dry process.

In the case of providing a plurality of image forming area on one image forming sheet so that information can be additionally recorded as in the abovesaid case, it is desirable that preheating and heat development of a desired one of the image forming areas do not exert any influence on the other areas. This is especially important when the image forming areas are provided in close proximity. Further, it is desired, of course, that the image forming apparatus has high resolution as is the case with ordinary other image recording apparatus. High resolution is required especially when an image of a subject is recorded, on a reduced scale, in each one of a number of image forming areas as in the case of a microfilm or microfiche. Incidentally, the image forming sheet must be heated for making it photosensitive and development; accordingly, there is a fear that the image forming sheet is deformed by heat to make it impossible to perform recording with high resolution. Moreover, since one recording operation involves at least three processes of preheating, exposure and heat development, the recording speed of the image forming apparatus using this image forming sheet is likely to be low; this is undesirable for successive recording of many subjects.

Another object of this invention is to provide image forming apparatus which enables high-resolution recording untouched by heating processes.

Another object of this invention is to provide image forming apparatus which permits high-speed recording.

Another object of this invention is to provide image forming apparatus which ensures to prevent a heating process of one image forming area from affecting the other image forming areas and hence permits providing the image forming areas in close proximity.

Still another object of this invention is to provide image forming apparatus which ensures to prevent the image forming sheet from being thermally distorted by a heating process of a desired one of a plurality of image forming areas.

SUMMARY OF THE INVENTION

According to this invention, use is made of an image forming sheet which is rendered photosensitive by activation accompanying preheating prior to exposure and which can record thereon an image by heat development at the photosensitive area exposed to a light image. The image forming sheet has a plurality of image forming areas, and one of them is made photosensitive by preheating with first heating means, and then the preheated area is exposed by exposure means to an optical image of a subject. The exposed area is heat-developed by second heating means. The image forming areas of the image forming sheet are each transferred by transfer means to the first heating means, the exposure means and the second heating means in a sequential order. These three means are arranged, for example, in alignment in such a manner as to enable parallel, simultaneous processing of the individual image forming areas of the same image forming sheet, thus permitting high-speed recording.

In the processing by each of the first heating means, the exposure means and the second heating means, the image forming area to be processed is fixed by fixing means at the processing position. The fixing means is, for example, a first frame-shaped member surrounding substantially one image forming area, and the image forming area is held in position by this frame-shaped member and another member. This prevents thermal deformation of the image forming sheet and ensures uniform heating of the entire image forming area; consequently, the same sensitivity is provided over the entire image forming area, and heat is prevented from transmission to the adjoining area. During exposure the image forming area can be placed accurately at the position where the image of a subject is formed, and the image forming area is held completely flat, so that high resolution can be obtained. Further, when a high-temperature solid body used as the heating means is held in contact with the image forming area, a pressurizing fluid, for example, pressurized air is applied to the image forming area on the size opposite from the high-temperature solid body to uniformly urge thereagainst the entire image forming area; this ensures uniform heating of the entire image forming area, prevents thermal deformation of the image forming sheet by the heating means and enables reduction of the time of heating.

The preheating temperature by the first heating means is usually selected to be in the range of 80° to 130° C., preferably 9° to 120° C., and the time of heating usually increases as the heating temperature becomes lower. The temperature for heat development by the second heating means is usually selected to be in the range of 100° to 150° C., preferably 110° to 130° C.

As the image forming sheet for use in this invention, use can be made of any image forming sheets which can be activated to be photosensitive by heating in a short time, exposed to a light image of a subject and heat-developed at the exposed area.

A typical example of this kind of image forming sheet is made of a material which is called the dry-silver photosensitive material containing an oxidation-reduction reaction system which includes at least an organic silver salt oxidizing agent and a silver ion reducing agent for a silver ion. A more specific example of this image forming material will hereunder be described.

A specific example of the image forming sheet for use in this invention is made of a material which consists essentially of a non-photosensitive organic silver salt oxidizing agent, a silver halide or a source of halogen ions capable of forming the silver halide by reaction with the organic silver salt oxidizing agent, a reducing agent for a silver ion, a binder, and a source of mercury ion. As another example of such a material for the image forming sheet that may be used in this invention, there is a material which consists essentially of a non-photosensitive organic silver salt oxidizing agent, a reducing agent for a silver ion, a binder, a source of mercuric ion, carboxylic acid and/or a sensitizing dye.

The former material is disclosed, for example, in U.S. Pat. Nos. 3,802,888, 3,764,329 and 4,113,496, whereas the latter one is disclosed, for example, in U.S. Pat. No. 3,816,132 and Japanese patent application Laid Open No. 127,719/76.

As examples of the above said non-photosensitive organic silver salt, there can be mentioned silver salts of long-chain fatty acids, or silver salts which are organic compounds having imino or mercapto group. The above silver salts include, for example, silver stearate, silver behenate, silver salts of benzotriazole, silver 5-nitrobenzotriazole, silver 5-nitrobenzimidazole, silver saccharin, silver phthalazinone, silver 2-mercaptobenzoimidazole, and silver 3-mercapto-4-phenyl-1,2,4-triazole. Of them, silver salts of long-chain fatty acids, such as silver stearate and silver behenate, are especially preferred. The organic silver salt oxidizing agent is used in an amount of about 0.1 to about 50 $g/m^2$, preferably 1 to 10 $g/m^2$. As the abovementioned silver halide, there are silver chloride, silver bromide, silver iodide, silver chlorobromoiodide, silver chlorobromide, silver iodobromide, silver chlorobromide and a mixture thereof.

The silver halide may be used in an amount of about 0.1 to about 40 mol %, preferably 0.5 to 20 mol %, based on the amount of the silver salt oxidizing agent.

As example of the source of halogen ions which capable of forming a silver halide by reaction with the organic silver salt oxidizing agent, there can be mentioned a reducible halogen compound having the essential structure —CONX— or —$SO_2NX$— where in X is chlorine, bromine or iodine, such as disclosed in U.S. Pat. No. 3,764,329. As another example of such source can be mentioned an inorganic halides represents by $HgX_2$, $CaX_2$, $COX_2$, $BaX_2$, CsX, RbX, $MgX_2$, $NiX_2$, $GeX_4$ and $PbX_2$ (X representing chlorine, bromine or iodine); organic halides having the specific element of which any one of Ga, Sn, Pb, P, As, Sb, Bi, Se and Te. Such halide, for example, may be used,

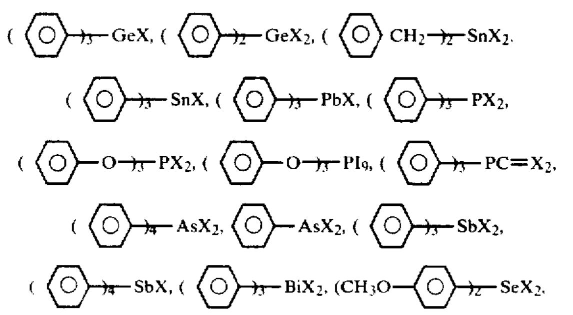

-continued

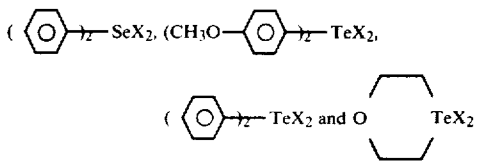

(X representing chlorine, bromine or iodine); halogen molecules or species selected from bromine, iodine, iodine chloride, iodine bromide and bromine chloride; complexes of halogen molecules and specific compound such as P-dioxane; and organic halogen compound, such as triphenylmethyl bromide, triphenylmethyl chloride, iodoform, 2-bromoethanal, α-bromodiphenylmethane, α-iodophenylmethane, α-chlorodiphenylmethane, α-bromo-di-(p-methoxyphenyl)methane, etc. The amount of such a halogen ion source to be used is about 0.1 to about 40 mol%, preferably 0.5 to 20 mol%, based on the amount of the organic silver salt oxidizing agent.

A reducing agent suitable for reducing silver ions is a hdindered phenol in which one or two sterically bulky groups are bonded to the carbon atom or atoms contiguous to the hydroxyl group-bonded carbon atom to sterically hinder the hydroxyl group. As example of such hindered phenols, there can be mentioned 2,6-di-tert-butyl-4-methylphenol, 2,2'-methylenebis (4-methyl-6-tert-butylphenol), 2,4,4-trimethylphentylbis (2-hydroxy-3,5-dimethylphenyl)-methane and 2,6-bis-(2'-hydroxy-3'-tert-butyl-5'-methylbenzyl)-4-methylphenol. The reducing agent may be used in the amount of 0.1 to 100 wt%, preferably 1 to 100 wt%, relative to the organic silver salt oxidizing agent.

As the source of mercuric ion source, there can be mentioned mercuric acetate, mercuric behenate, mercuric benzoanate and mercuric halide.

As the organic carbonic acid, behenic acid, stearic acid and so forth are suitable. The amount of source of mercuric ion to be used is 0.1 to 7% based on the amount of the silver, which used the image forming sheet.

As the sensitizing dye, merocyanine is suitable, and examples of such dye include such as those set forth in "Organic Chemicals List", published by Nippon Kanko Shikiso Kenkyusho (Japan Photosensitive Dye Institute, pp 102–105, 1969, and pp 25–27, 1974.

As the binder, there can be mentioned polyvinyl butyral, polyvinyl formal, polymethyl metacrylate, cellulose acetate, polyvinyl acetate, cellulose acetate propionate, cellulose acetate butyrate, polystyrene and gelatin. Of them, polyvinyl butyral is especially suitable as the binder. They may be used singly or in the form of a mixture of two or more of them. It is preferred that the binder may be used in such an amount that the weight ratio of the binder to the organic silver salt oxidizing agent is in the range of from about 10/1 to about 1/10, preferably 1.2/1 to ½.

The material of the image forming sheet for use in this invention may further contain, as required, modifiers such as a toner for a silver image, a background-darkening preventive agent and a sensitizer in addition to the abovesaid ingredients. As the toner for a silver image, there can be mentioned, for example, phthalazinone and phthalimide. As the background-darkening preventive agent, there can be mentioned, for example, tetrabromobutane, hexabromocyclohexane and tribromoquinalidine.

The abovementioned composition is coated on a transparent support, such as a polyethylene film, a cellulose acetate film or a polyester film, together with the above-mentioned binder and a suitable solvent. The thickness of the coating is about 1 to about 1,000μ, preferably 3 to 20μ. The ingredients of the composition may each be laminated in two or more layers, optionally. The sheet thus obtained is non-photo-sensitive under normal lighting conditions, and it can be handled in a light room. When a given area of this sheet is preheated in the dark, this area is rendered photosensitive.

DESCRIPTION OF THE PREFERRED EMBODIMENTS

Figure 1:
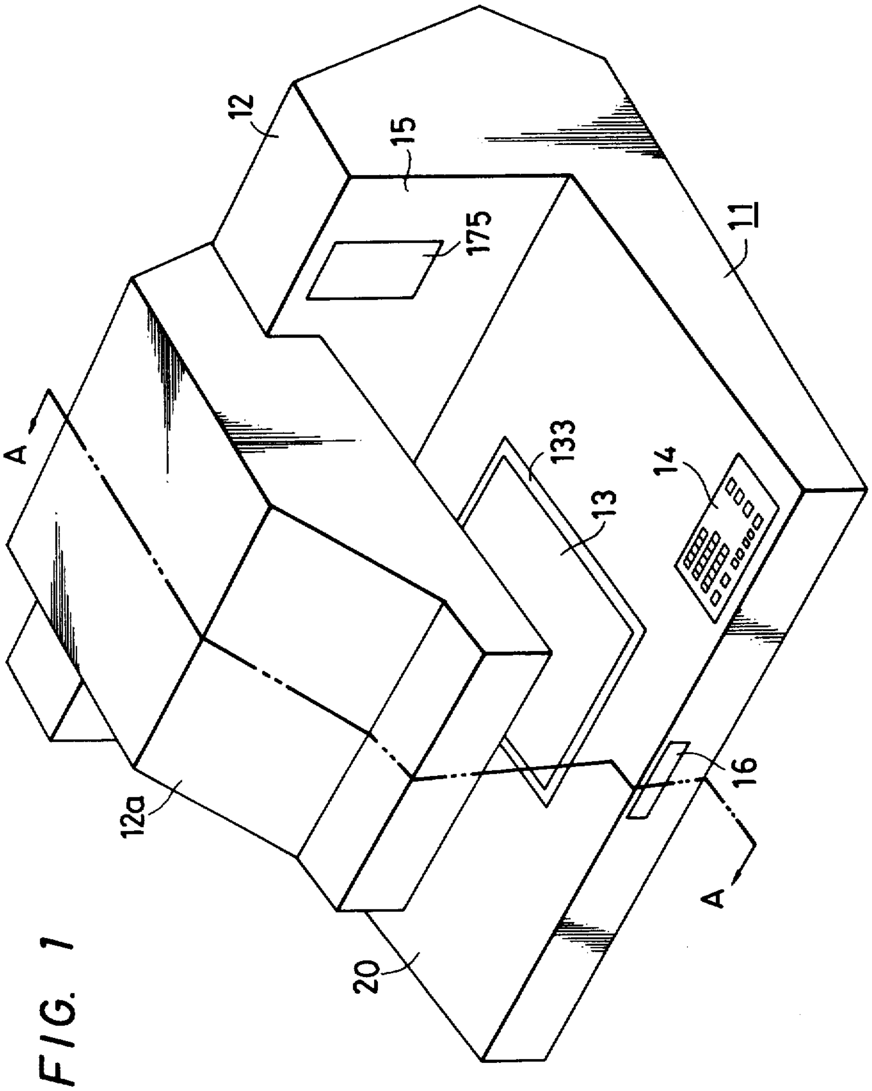
FIG. 1 is a perspective view schematically showing an external appearance of the image forming apparatus of this invention.

The image forming equipment of this invention has an external appearance such, for example, as shown in FIG. 1. A housing 12 is mounted on a base 11 at its backward portion and a subject holding part 13 is provided on the base 11 at its forward portion. An optical image introducing part 12a for introducing reflected light from the subject holding part into the housing 12 is mounted thereon to extend above the subject holding part 13. A control panel 14 is disposed on an upper panel 20 of the base 11 at a corner near its front panel, the control panel 14 having arranged thereon various control keys for controlling the image forming equipment. The front panel of the base 11 has mounted thereon a lid 16 for covering an image forming sheet insertion window. A screen 175 for projecting thereon an image is provided on a front panel 15 of the housing 12 at its one side.

Figure 2:
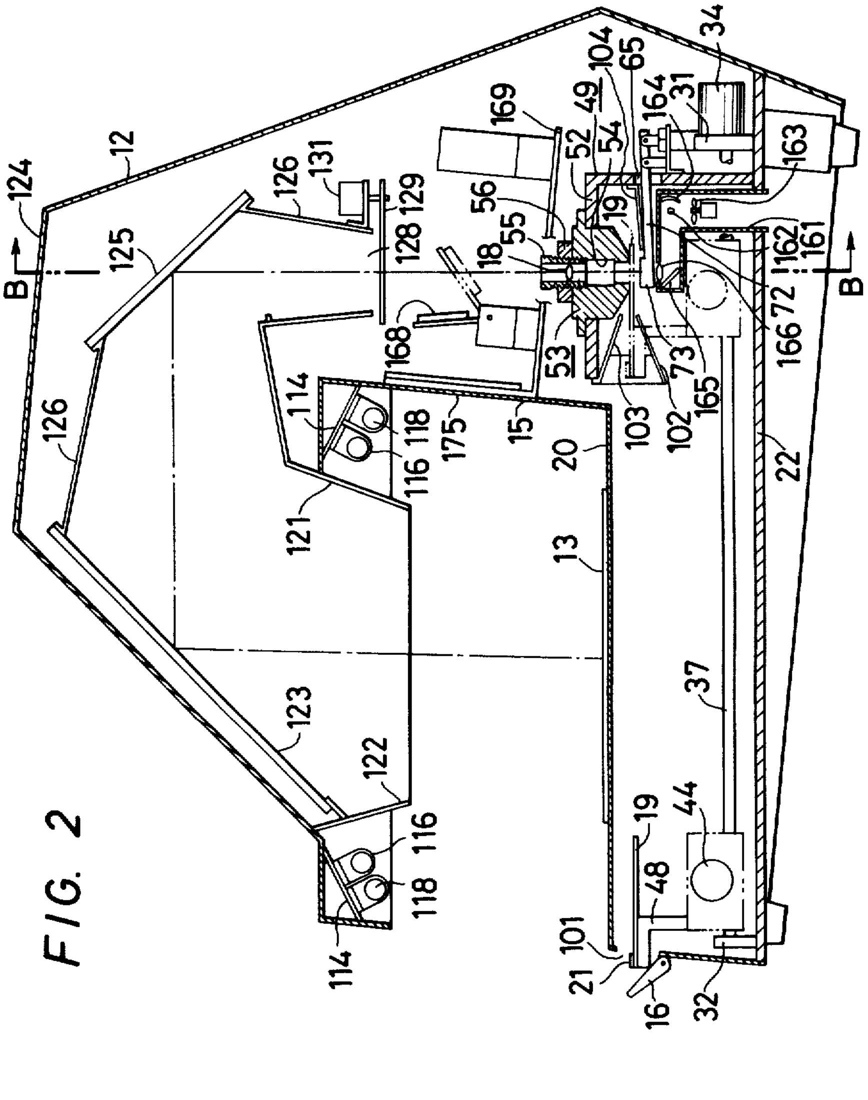
FIG. 2 is a cross-sectional view taken on the line A—A in FIG. 1.
Figure 3:
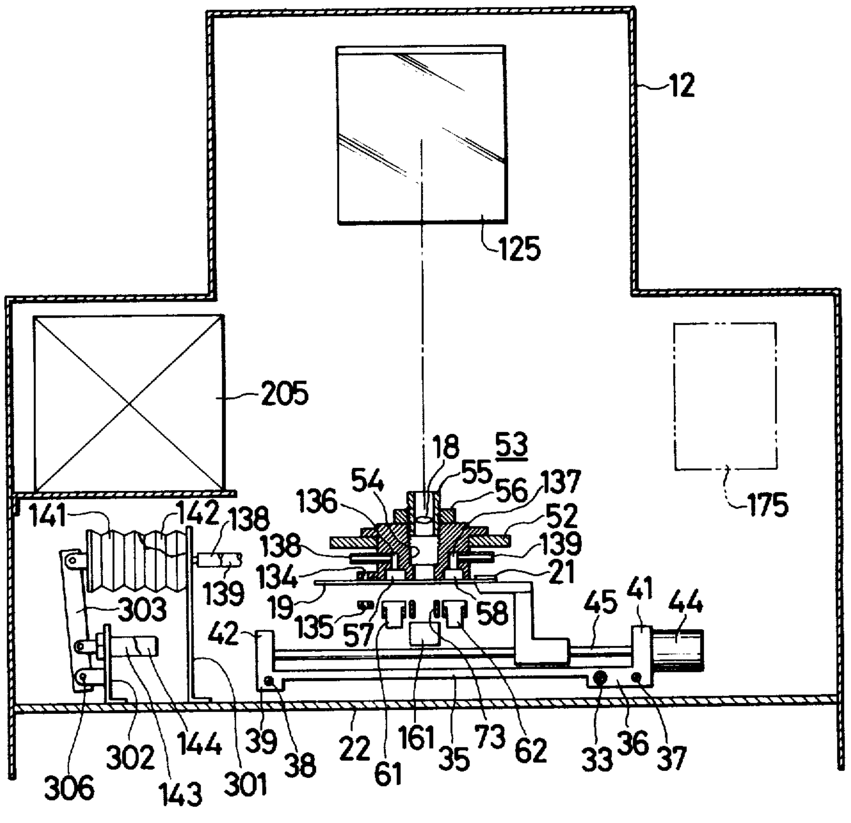
FIG. 3 is a cross-sectional view taken on the line B—B in FIG. 2.

As shown in FIGS. 2 and 3, a projecting lens 18, which forms a part of exposing means, is disposed in the housing 12 at the center thereof. An image forming sheet 19 is movably placed at a position where an image of a subject projected by the lens 18 is formed, i.e. at an image exposing position. The image forming sheet 19 is held by a holder 21, as shown in FIG. 4, and the holder 21 is supported and carried by transfer means.

Figure 4:
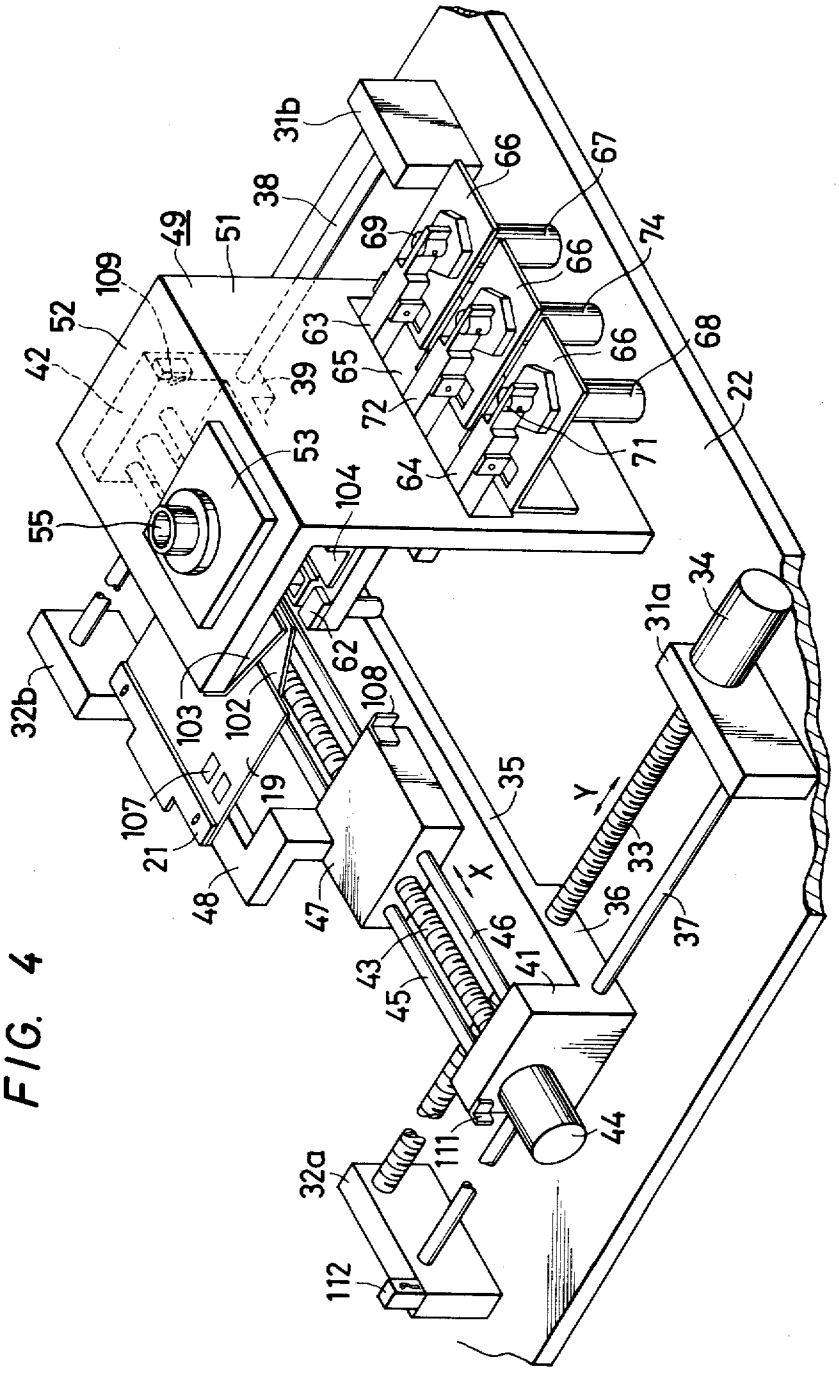
FIG. 4 is a perspective view showing the relationship between image forming sheet transfer means and a body tube members.

The transfer means is arranged, as shown in FIGS. 2 and 3 are as illustrated on an enlarged scale in FIG. 4. The upper panel 20 of the base 11 on which the subject holding part 13 is provided is slightly tilted forwardly, and a base plate 22 in the base 11 is also slightly slanted forwardly. As shown in FIG. 4, supports 31a, 31b, 32a and 32b are mounted on the base plate 22 near its four corners.

A threaded shaft 33 is rotatably installed between the supports 31a and 32a to extend in a direction perpendicular to the front panel of the base 11. One end portion of the threaded shaft 33 projects out of the support 31a, and a Y-direction motor 34 is mounted on the support 31a on the side of the projecting end portion of the threaded shaft 33. The threaded shaft 33 is driven by the Y-direction drive motor 34. The threaded shaft 33 is screwed in a tapped hole made in a support portion 36 formed at one end portion of a Y-direction moving member 35 which extends in a direction perpendicular to the direction of extension of the threaded shaft 33, so that the Y-direction moving member 35 is moved by the rotation of the threaded shaft 33 in the direction of its extension. Between the supports 31a and 32a is also bridged a guide rod 37 in adjacent and parallel relation to the threaded shaft 33, and the guide rod 37 is inserted in a through hole made in the support portion 36, by which the moving member 35 is held in a manner to be movable without rotation. Similarly, a guide rod 38 is installed between the supports 31b and 32b and inserted in a hole made in a support portion 39 formed at the other end portion of the moving member 35, permitting the moving member 35 to move in parallel to the base plate 22 in the direction of extension of the threaded shaft 33. Let this direction of movement be assumed to be a Y-axis direction, for example. A pair of support pieces 41 and 42 are fixedly secured to the both end portions of the Y-direction moving member 35 which is made movable in the Y-direction. An X-direction threaded shaft 43 is rotatably bridged between the support pieces 41 and 42. One end of the X-direction threaded shaft 43 projects out of the support piece 41, and an X-direction drive motor 44 is fixedly mounted on the support piece 41 on the side of the projecting end of the threaded shaft 43. The X-direction threaded shaft 43 is driven by the motor 44. In adjacent and parallel relation to the X-direction threaded shaft 43, guide rodes 45 and 46 are bridged between the support pieces 41 and 42. An X-direction moving member 47 is provided through which the X-direction threaded shaft 43 and the guide rods 45 and 46 extend. The X-direction moving member 47 and the X-direction threaded shaft 43 are threadably engaged with each other; accordingly, rotation of the X-direction threaded shaft 43 causes the X-direction moving member 47 to move to the right and left, that is, in the X-axis direction.

Figure 6:
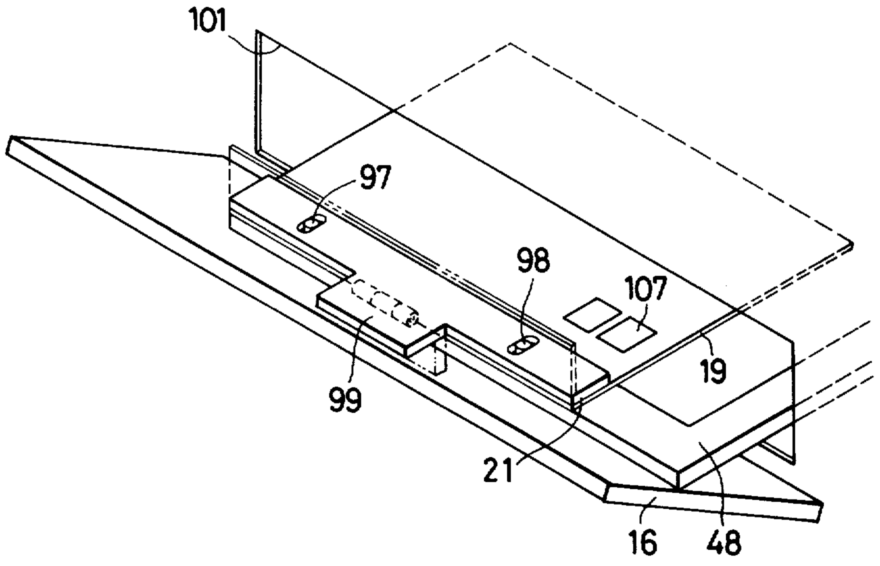
FIG. 6 is a perspective view illustrating the state in which an image forming sheet holder is positioned at an image forming sheet insertion window.

The X-direction moving member 47 has attached thereto an arm-shaped support 48, to which is pivoted the image forming sheet holder 21, as shown in FIGS. 2, 4 and 6. A pair of positioning pins 97 and 98 planted on the support 48 are inserted into apertures formed in one marginal portion of the image forming sheet 19, and the marginal portion of the sheet 19 is pressed by the holder 21 against the support 48. In this case, a coiled spring is mounted about the pivot of the holder 21 though not shown, and by this spring the holder 21 is urged against the support 48 with the image forming sheet 19 gripped therebetween. The holder 21 has made therein holes for receiving the positioning pins 97 and 98. To facilitate mounting and dismounting of the image forming sheet 19, an intermediate portion of the outer marginal portion of the holder 21 is formed to project outwardly, providing an operating piece 99. By pressing the operating piece 99, the holder 21 can easily be turned against the biasing force of the abovesaid coiled spring.

The lid 16 is also adapted to be automatically closed by a spring. When the image forming sheet 19 is mounted on the support 48 or dismounted therefrom, the holder 21 is brought forward, by the Y-direction motor 34, to its outermost position, where the support 48 pushes the lid 16 forwardly through an opening 101 (FIG. 6) formed in the front panel of the base 11; namely, the lid 16 is turned to open against the biasing force of the spring (not shown) so that the holder 21 comes out from the opening 101. This position is a reference position of the holder 21, where the image forming sheet 19 can be mounted on or dismounted from the support 48. When the support 48 is brought back into the base 11, the lid 16 is automatically turned to cover the opening 101. Thus, unnecessary light can automatically be shut out of the equipment.

It is preferred to provide a guide by which the image forming sheet 19 held by the holder 21 is brought to an exposing or heating position. The guide comprises, for example, upper and lower guide plates 103 and 102 attached to a photographing unit support 49, as depicted in FIGS. 2 and 4. The distance between the upper and lower guide plates 103 and 102 is gradually reduced as a body tube member 53 supporting the projecting lens 18 is approached, and the image forming sheet 19 is guided to the exposing or heating position under the body tube member 53 passing between the guide plates 103 and 102.

Further, a guide plate 104 for guiding the image forming sheet 19 having moved past the body tube member 53 is attached to a vertical wall 51 of the photographing unit support 49 to extend backwards from the vicinity of the body tube member 53 under the image forming sheet 19, that is, on the side of the base plate 22.

It is preferred that these guide plates 102 to 104 are made of resilient thin sheet of a synthetic resin or phosphor bronze. The guide plates need not always be made flat but may also be curved. With the provision of such guide, the image forming sheet 19 pressed by the holder 21 at one side only can surely be brought to a photographing position without being bending. The guide is not limited specifically to the abovesaid but may also be other types. For example, in the case of the image forming sheet 19 being bent, it is possible to guide the sheet 19 by revolving belts or rollers to the photographing position while straightening the bend of the sheet 19.

The image forming sheet 19 has a plurality of image forming areas or so-called frames 107 arranged in a matrix form, as shown in FIG. 4. The image forming sheet 19 is mounted on the support 48 in such a manner that any desired one of the frames 107 can be brought exactly to the exposing or heating position. The support 48 is halted at the aforementioned reference position, where the holder 21 assumes its outermost position. To perform this, for example, as shown in FIG. 4, a projecting piece 108 is secured to the X-direction moving member 47 so that immediately before the X-direction moving member 47 reaches the support 42, the projecting piece 108 moves into contact with the microswitch 109 attached to the support 42 to stop there the X-direction movement. Likewise, a projecting piece 111 is secured to the support 41 of the Y-direction moving member 35, and immediately before the moving member 35 reaches the support 32, the projecting piece 111 moves into contact with a microswitch 112, halting there the Y-direction movement. In this manner, by driving the microswitches 109 and 112, the support 48 is stopped at the reference position, that is, at its outermost position. As the motors 44 and 34, use is made of drive motors capable of controlling the amount of movement with high accuracy, for example, step motors, and by the numbers of pulses applied to the motors, the amount of movement of the image forming sheet 19 from the aforesaid reference position in the X- and Y-axis direction can be determined and an accurate position of the image forming sheet 19 can be detected. In the manner described above, a desired one of the frames or the image forming areas 107 on the image forming sheet 19 is brought to the heating or exposing position.

The image forming sheet 19 may take the form of not only a microfiche that a plurality of frames are arranged in matrix form on a sheet of film but also a roll film having arranged thereon many frames in side-by-side relation. The microfilm-type image forming sheet 19 may be held by the holder at two or more sides as well as at one side; however, from the standpoint of contacting the image forming sheet 19 with the end face of a heater over its entire area and pressing the sheet 19 against the body tube member 53, it is preferred that the sheet 19 is held at one side.

Reference is made next to FIGS. 2 to 4 for illustrating an example of each of heating means, and exposure means which form the principal part of the equipment of this invention, and for describing the construction of each of them at each of heating, and exposing positions in the illustrated embodiment. In this embodiment, the heating means comprises preheating means and heat-developing means provided separately, and these two means are described to be in the form of high-temperature solid bodies, for example, metal blocks. As shown in FIGS. 3 and 4, the inverted L-shaped photographing unit support 49 is fixedly mounted on the base plate 22 at its backward portion. The vertical wall 51 of the support 49 extends upwardly of the base plate 22 at substantially right angles thereto, and an upper horizontal plate member 52 of the support 22 extends towards the front panel 15 in substantially parallel relation to the base plate 22. The upper plate member 52 has made therein a hole 55, in which the body tube member 53 is snugly fitted and fixed.

The body tube member 53 is formed, for example, with a metal block, in which a through hole 54 is formed to extend in a direction vertical to the base plate 22, and the lens 18 is disposed in the through hole 54. In the body tube member 53 there are formed on the left and right of the through hole 54 recesses 57 and 58 which open to the base plate 22, and the recesses 57 and 58 each have a size corresponding to each image forming area or frame 107 of the image forming sheet 19. The peripheral margin of each recess, on all sides, is made frame shaped to form a part of means for fixing the image forming sheet 19 during heating.

Figure 5:
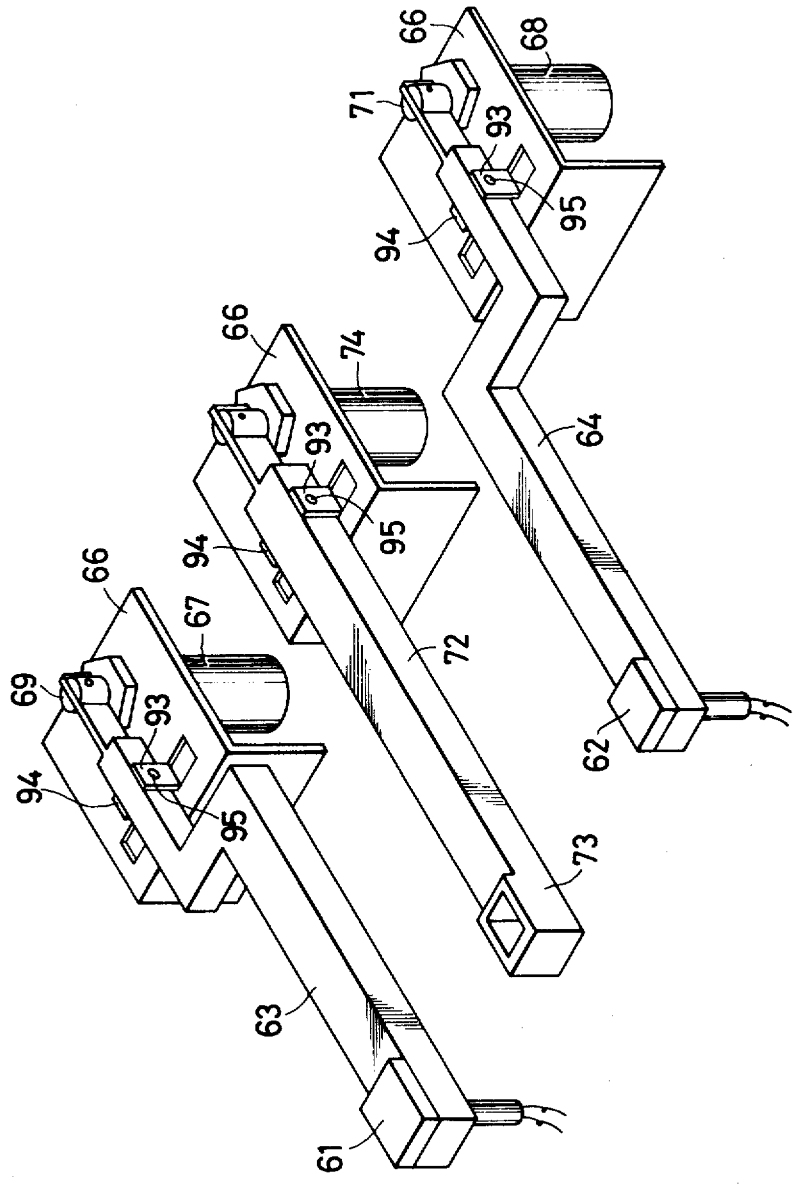
FIG. 5 is a perspective view showing, by way of example, a drive mechanism for a frame-shaped member of a heater.

In opposing relation to the recesses 57 and 58 there are disposed a first heater 61 for preheating use and a second heater 62 for heat-developing use. The heaters 61 and 62 are respectively carried at one end of rotary levers 63 and 64 which extend in direction perpendicular to the vertical wall 51 of the photographing unit support 49, as shown in FIGS. 4 and 5. The rotary levers 63 and 64 project out backwardly through an opening 65 made in the vertical wall 51 of the photographing unit support 49. The rotary levers 63 and 64 are each pivotally mounted at the intermediate portion on a pin 95 bridged between a pair of lugs 93 and 94 cut to rise up from a bracket 66 secured to the back of the vertical wall 51. The rear end portions of the rotary levers 63 and 64 are pivotally coupled with plungers 69 and 71 and 69*a* of solenoids 67 and 68 mounted on the brackets 66 respectively. By controlling the solenoids 67 and 68, the rotary levers 63 and 64 are turned to urge the heaters 61 and 62 against the image forming sheet 19. The frames of the image forming sheet 19 are respectively held and fixed by the frame-like member of the recess 57 and the heater 61, and the frame-like member of the recess 59 and the heater 62. The end faces of the heaters 61 and 62 on the side of the image forming sheet 19 are of substantially the same size as each frame of the image forming sheet 19 but a little larger than the recesses 57 and 58.

In the above, one of each image forming sheet fixing means is described to be framed, but the fixing means is only to fix, during at least heat treatment, the image forming areas of the image forming sheet 19 which are subjected to preheating and exposure to light and heat-development; therefore, the fixing means may also be plate-like member or the like. From the viewpoint of uniform image processing, however, it is preferred that at least one of each fixing means is frame-shaped. In the case where a photosensitive material layer is formed on a substrate, it is preferred that the side of the photosensitive material layer of the image forming sheet is framed. The same is true of fixing means of exposure means described later.

As shown in FIGS. 2 and 3, the through hole 54 of the body tube member 53 is threaded, and a body tube 55 having screw threads formed on its outer pheripheral surface and carrying the lens 18 is screwed into the through hole 54. By turning the body tube 55, the position of the lens 18 is adjusted relative to the image forming sheet 19 placed in contact with the end face of the body tube member 53, by which it is possible to perform fine control of the position where the image of a subject is formed. The position of the body tube 55, and accordingly the position of the lens 18 is fixed by tightening a nut 56 threadably engaged with the body tube 55. The size of the open end of the through hole 54 on the side of the image forming sheet 19 corresponds to the area of one frame of the image forming sheet 19, and the peripheral margin defining the open end is also used as a frame forming a part of the means for fixing the image forming sheet 19 during exposure.

As shown in FIG. 5, a rotary lever 72 is interposed between the rotary levers 63 and 64 in parallel relation thereto so as to ensure that during exposure the image forming sheet 19 is retained accurately at the position where the image of a subject is formed. The rotary lever 72 carries at one end a second hollow, frame-like member 73 for exposure use and is pivoted at the other end to a solenoid 74 mounted on a bracket 66, and further, the lever 72 is pivotally mounted, at its intermediate position, on a pin 95 bridged between a pair of lugs 93 and 94 cut to rise up from the bracket 66. By controlling the solenoid 74, the rotary lever 72 is turned, by which the image forming sheet 19 is urged by the second frame-shaped member 73 for exposure use against the frame-like peripheral margin of the through hole 54 of the body tube member 53 serving as the other frame-like member; consequently, the image forming sheet 19 is gripped between the both frame-like members and hence fixed in position. In this case, the second frame-shaped member 73 is made a little layer than the through hole 54 to assume that the image forming sheet 19 is pressed against the body tube member 53. The hollow, frame-shaped member 73 need not always be frame-shaped but may also be plate-shaped, but it is preferred to be hollow, frame-shaped in order to form, therein a path of light from a light source 162 for reading by a reader described later.

FIG. 3 illustrates a preferred arrangement in which the recess 57, the through hole 54 and the recess 58 are equal in the center-to-center distance to the successive image forming areas or frames of the image forming sheet 19 and are disposed in alignment, and in which the preheating means, exposure means and the heat-developing means are positioned respectively corresponding to the successive image forming areas.

Figure 9A:
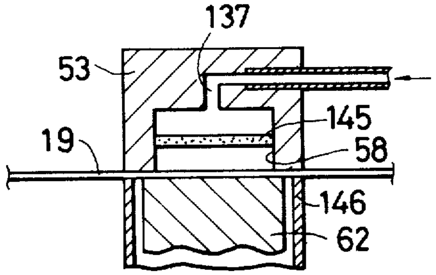
FIGS. 9A to 9C are cross-sectional views respectively showing other modified forms of the body tube member and a heater.

FIG. 9A shows a modified form of the fixing means for fixing the image forming sheet 19 when the heating means is pressed against it. This fixing means comprises first and second frame-shaped members for gripping therebetween the image forming sheet 19. The second frame-shaped member, indicated by 146, for pressing the image forming sheet 19 is provided to surround the heater 62. Pressing the image forming sheet 19 by the second frame-shaped member 146 against the first frame-shaped member constituted by the end face of the recess 58 for heating use formed in the body tube member 53, one frame of the image forming sheet 19 is held by the both frame-shaped members on all sides. At the same time, even if temperature of the heater 62 becomes unneccessarily high in excess of a required value, heat diffusion to the adjoining frames can be prevented. Further, fixing of the image forming sheet 19 during heating permits uniform heating of the entire image forming area, ensuring to obtain the same sensitivity over the entire area and prevent deformation of the sheet 19 which otherwise would occur due to heating. This is effective for enhancement of sensitivity.

The second frame-shaped member 146, shown in FIG. 9A, can also be used with the heater 61. It is particularly preferred to actuate the heater 61 after fixing in position the image forming sheet 19 with two frame-shaped members, i.e. fixing means composed to the second frame-shaped member 146 and the end face of the recess of the body tube member 53. Moreover, if the frame-shaped member for heating use, the body tube member and/or the frame-shaped member for heat-developing use respectively have a size of one frame of the image forming sheet and are fixed or formed as a unitary structure, the arrangement is simplified as compared with that in the case where they are provided and actuated separately.

In general, when the image forming sheet has a plurality of frames, they are arranged in alignment, and accordingly it is desirable that the at least the first heating means, the exposure means and the second heating means are also disposed in alignment.

The first heating means, the exposure means and the second heating means are usually provided in adjacent relation, but other means may also be interposed between them, as required.

The image forming area of the image forming sheet, after being activated by the first heating means to be rendered photosensitive, is shifted by one frame to an exposure position, where an image of a subject disposed on the subject holding part 13 is projected onto that frame of the image forming sheet 19 brought to the exposure position. To this end, a lamp support plate 114 is attached to the underside of the inner end portion of the optical image introducing part 12*a* obliquely above the subject holding part 13, as shown in FIG. 2. The lamp support plate 114 has mounted thereon lamp sockets 116 side by side for receiving long fluorescent lamps 118. The support plate 114 is arranged so that lights from the fluorescent lamps 118 are directed to the subject holding part 12*a*.

Reflected light of the subject placed on the subject holding part 13 moves towards the optical image introducing part 12*a* in a direction substantially perpendicular to the base 11. A light receiving window 121 is formed in the optical image introducing part 12*a* to open to the subject holding part 13. A hood 122 is attached to the window 121 to extend therefrom downwardly for shielding from unnecessary external light. Having entered in the optical image introducing part 12*a*, the reflected light from the subject strikes against a reflector 123 installed in the optical image introducing part 12*a* at an angle of substantially 45° to the base plate 11, and the reflected light is reflected by this reflector 123 at substantially right angles to move on backwards substantially in parallel with the base 11, thus entering into the housing 12. Above the body tube member 53, that is, on the side of a top panel 124 of the housing 12, a reflector 125 is disposed, and the light reflected from the reflector 123 is reflected by the reflector 125 to pass towards the projecting lens 18 of the body tube member 53 along its optical axis.

Also in the optical image introducing part 12*a* and the housing 12, there is provided a tubular light shielding box 126 which extends from the inner edge of the hood 122 surrounding the optical paths between the reflectors 123 and 125 and between the reflector 125 to a shutter 129.

In this manner, the image of the subject on the subject holding part 13 is reflected by the reflectors 123 and 125 and then projected by the lens 18 onto the image forming sheet 19. In order to determine the time for exposing the image forming sheet 19 to the image of the subject, there is provided on the light shielding box 126 on the side of the reflector 125 the shutter 129 for opening and closing the optical path 128 on the side of the projecting lens 18. The shutter 129 is driven, for example, by a solenoid 131 to open and close. The shutter 129 is opened by known automatic exposure detecting means (though not shown) for a right exposure time. Needless to say, the photosensitive material layer of the image forming sheet 19 confronts the through hole 54 of the body tube member 53.

A variety of tactics are considered for preventing the likelihood of accidental re-recording on an already recorded frame, that is, double image formation. One of effective methods for use with the equipment of this invention is to dispose a strip of a reflective material on at least one side, preferably on all sides of the subject holding part 13 substantially corresponding to one image forming area of the sheet 19 and to photograph the strip along with the subject. For example, as shown in FIG. 1, a highly reflective frame 133 of high reflection factor is formed on the marginal portion of the subject holding part 13 on all sides. That is, the subject holding part 13 is formed with a substrate of a color of low reflection factor, for example, black, and is surrounded with a square frame 133 made of a white material, aluminum foil or like high-reflection-factor material and whose inside dimension is equal to the outside one of the subject holding part 13 corresponding to one frame. A subject is placed within the highly reflective frame 133 and positioned relative to the frame 133, and a record of density depending on the reflection factor of the highly reflective frame 133 is always provided on the inner marginal portion of the image forming area of the image forming sheet 19 corresponding to the marginal portion of the subject. The highly reflective frame 133 may also be made in a projecting form on one or all sides.

In order to detect the already recorded frame, there is disposed a doulbe image formation preventive detector for checking whether or not the margin of the subject is photographed on the frame subject to the check, at a position spaced a distance of one frame of the image forming sheet 19 form the recess 57 of the body tube member 53 on the opposite side from the through hole 54. This double image formation preventive detector is composed of, for example, a photo diode or like light emitting device 134 and a photo transistor or like photo detector 135 which are provided with the image forming sheet 19 interposed therebetween.

The light emitting device 134 is mounted on an extension of the body tube member 53, whereas the photo detector 135 is supported so that it can be advanced and retracted relative to the image forming sheet 19 in the same manner as the heater 61, though not illustrated. Where the quantity of light received by the photo detector 135 is less than a predetermined value, it is decided that the frame is an already recorded one.

Figure 11:
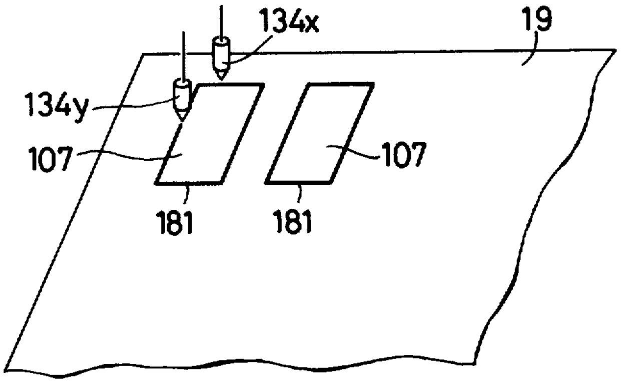
FIG. 11 is a diagram showing the relationship between frames of the image forming sheet and double exposure checking elements.

Next, the double image formation preventive means will be described in more detail. For example, as shown in FIG. 11, in the case of an already recorded frame, there is formed around the frame 107 on the image forming sheet 19 a record frame 181 of high density corresponding to the highly reflective frame 133 of the subject holding part 13 described previously in respect to FIG. 1. Light emitting devices 134*x* and 134*y* are disposed opposite the X- and Y-direction parts of the record frame 181 respectively, and photo detectors 135$x$ and 135$y$ are arranged in opposing relation to the light emitting devices 134$x$ and 134$y$ respectively although they are in the shadow of the image forming sheet 19 in FIG. 11.

Figure 12:
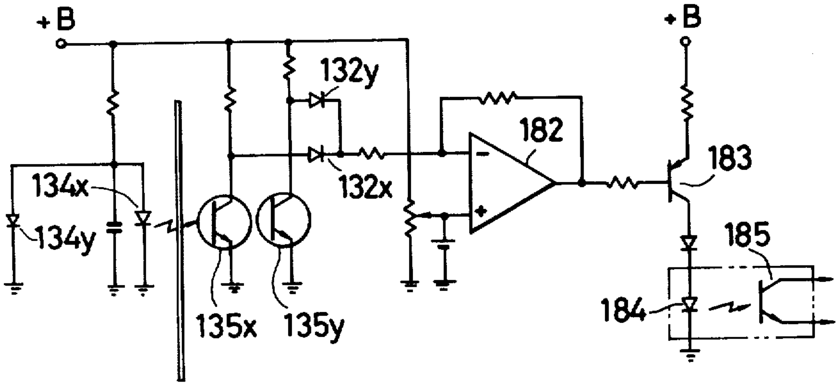
FIG. 12 is a circuit diagram illustrating an example of a double image formation preventive means.

The light emitting devices 134$x$ and 134$y$ are disposed opposite to the photo detectors 135$x$ and 135$y$ respectively corresponding thereto, with the image forming sheet 19 interposed therebetween, as shown in FIG. 12. In this example, the photo detectors 135$x$ and 135$y$ are photo transistors, whose collectors are respectively connected to one input terminal of a comparator 182 via diodes 132$x$ and 132$y$ forming an OR circuit, the other input terminal of the comparator 182 being supplied with a reference voltage.

When either one of the photo detectors 135$x$ and 135$y$ happens to confront the record frame 181, the photo detector output supplied to the comparator 182 increases higher than the reference voltage, and the comparator 182 provides a low-level output. The low-level output is applied to a PNP transistor 183 to conduct it, and a light emitting diode 184 is lighted, with the result that a photo detector 185 combined with the diode 184 to constitute a photo coupler is given information indicating that the frame is an already recorded one.

In the case where a pair of photo detector and light emitting device for detecting the record frame is provided for each of the X- and Y-directions of the record frame 181 as described above, even if the pairs of photo detectors and light emitting devices are a little out of position relative to the image forming sheet 19, at least one of the pairs confronts the record frame 181, ensuring the detection of the record frame.

In the above, use is made of transmitted light through the record frame 181 photographed on the image forming sheet 19 for preventing the double image formation, but it is also possible to employ reflected light from the record frame 181. Also it is possible to use transmitted light through or reflected light from an image photographed in the frame without providing and photographing the highly reflective frame 133. This double image formation preventing means is preferred to be disposed in alignment with the first heating means, the exposure means and the second heating means, exposure means and the second heating means are arranged in alignment.

When the image forming sheet 19 has been moved in the X-axis direction to bring the frame to be recorded to the position of the double image formation preventing means, as shown in FIG. 3, it is checked by the light emitting device 134 and the photo detector 135 whether the frame is an already recorded one or not. Where it is detected that the frame is unrecorded, instructions are given to image forming sheet transfer means, and the image forming sheet 19 is moved a distance of one frame to the preheating position, where the frame is heated for activation. The frame of image forming sheet 19, thus rendered photosensitive by activation, is then brought moved to the exposure position, where the image of a subject is projected to the frame. The thus exposed frame is then shifted a distance of one frame to the heat-developing position, where the latent image carried by the frame is developed by heating, thus completing recording on one frame.

In the present invention, it is preferred, for uniform image formation over the entire area of each frame, to provide pressurizing means so that when the preheating or heat-developing means is a high-temperature solid body, a fluid pressure can be applied to the heated part of the image forming sheet on the opposite side from the solid-body means.

The pressurization using fluid pressure is performed after or at the same time as the image forming sheet is fixed in position by the fixing means, preferably while the above-said solid-body means is in contact with the image forming sheet. As a fluid for this purpose, a gas is suitable; in particular, pressurized air is preferred. By uniformly pressurizing at least one image forming area of the image forming sheet with the fluid towards the heating solid body, the entire image forming area is closely contacted with the solid body surface under a uniform contact pressure, and hence is heated uniformly. As a consequence, uniform preheating makes the image forming area photosensitive all over it, uniform heat-development provides a sensitivity rise without dispersion, thus ensuring image formation of excellent reproducibility. Further, it is possible to avoid heat deformation of the image forming area which is caused by pressurization and heating of the image forming sheet by the heaters during heating. It is desirable that the pressure applied to the image forming sheet by pressurization with fluid is in the range of 100 to 1000 $mmH_2O$.

Figure 7:
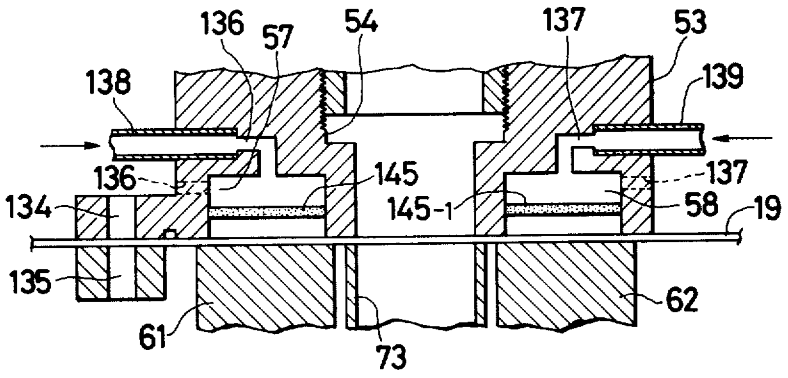
FIG. 7 is a cross-sectional view illustrating example of a body tube portion.

As a preferred example of the pressurizing means, gas inlet ports 136 and 137 are respectively formed in the body tube member 153 to extend from the bottoms of the recesses 57 and 58 to the outside, as shown in FIGS. 3 and 7. The gas inlet ports 136 and 137 are respectively connected via pipes 138 and 139 to bellows 141 and 142 serving as pressurized gas sources. To the bellows 141 and 142, plungers of plunger solenoids 143 and 144 are pivotally coupled at one end, and by energization of the plunger solenoids the bellows are contracted to supply air therefrom to the recesses 57 and 58 via the pipes respectively corresponding thereto.

An arrangement for expanding and contracting the bellows 141 is such, for example, as shown in FIG. 3. The bellows 141 is fixed at one end to a mounting plate 301 secured to the base plate 22, and the solenoid 143 is also mounted to a mounting plate 302 fixed to the base plate 22. By energization of the solenoid 143, one end of a link 303 is turned about a pin 306 bridged between a pair of lugs cut to rise up from the mounting plate 302, pressing the other end of the bellows 141 towards the mounting plate 301 to contract the bellows 141. Upon de-energization of the solenoid 143, the bellows 141 is expanded by the spring force of the solenoid 143 to return to its original position. The bellows 142 are also expanded and contracted by the same arrangement as described above. As the pressurized gas source, a pressure pump is preferred other than the bellows, and in such a case, pressure can properly be applied to each of the pressure by driving the pump.

FIG. 7 is a cross-sectional view showing, on an enlarged scale, the state in which the heaters 61 and 62, and the second frame 73 for exposure use are urged against the body tube member 53 with the image forming sheet 19 gripped therebetween. When air pressure is applied to the recesses 57 and 58 in the state that the image forming sheet 19 is pressed against the body tube member 53 by the heaters 61 and 62, those areas of the image forming sheet 19 underlying the recesses 57 and 58 are urged uniformly against the heaters 61 and 62 accordingly, the image forming sheet 19 is heated uniformly all over these areas. The sizes of the recesses 57 and 58 are selected larger than the size of one frame including its margin, so that the marginal portions of the recesses 57 and 58 do not touch the image forming area, that is, the marginal portion of each recess lies on the outside of a projected image of the highly reflective frame 133 for double image formation preventive use.

In the example of FIG. 7, pressure distributing plates 145 and **145*b* are respectively disposed in the recesses 57 and 58 at their intermediate portion in opposing relation to the image forming sheet 19. These plates may be made of a sintered metal, for example, of brass or stainless steel, or sponge or like porous material, or they may also be plates, each having perforations distributed substantially uniformly over the entire area. In short, air pressure supplied from the inlets 136 and 137 is distributed by the plates 145 and 145*b* to be applied uniformly to the image forming sheet 19**.

But the abovesaid distributing plates can be dispensed with by a modification of the positions of the pressurized gas inlet ports, that is, forming the pressurized gas inlet ports 136, and 137 in the side walls of the recesses 57 and 58, as indicated by the broken lines in FIG. 7, or spacing the gas inlet ports as far apart from the image forming sheet 19 as possible.

Figure 8:
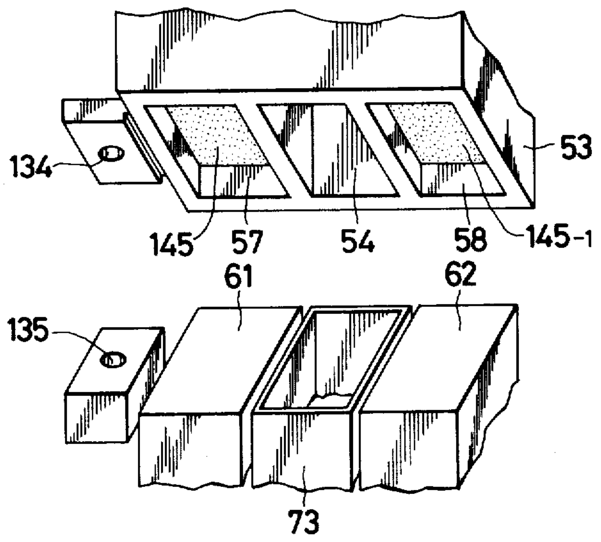
FIG. 8 is a perspective view of a frame-shaped member of the body member of FIG. 7 as viewed from the side of an image forming sheet.

As the heating means, high-temperature solid bodies are especially preferred which are of the type that make direct contact with the image forming sheet during heating. Further, it is desirable that the heat are of a size larger than the inside dimension of each of the recesses 57 and 58 having the frame-shaped marginal portions on all sides but not so large as to overlap the adjoining frames and hold the image forming sheet 19 in combination with the frame-shaped marginal portion of each of the recesses 57 and 58. FIG. 8 shows, in perspective, the body tube member 53 and the side on which are provided the heaters 61 and 62 and the second frame 73 for exposure use. If the body tube member 53 is made of a material of relatively high thermal conductivity, such as brass, then heat of the heaters 61 and 62 is absorbed into the body tube member 53 of large thermal capacity through the image forming sheet 19 at the marginal portions of the heaters, ensuring to avoid the influence of heating on the adjoining frames.

FIG. 9 illustrates modified forms of the means for uniformly heating one frame of the image forming sheet. In FIG. 9A, a second frame-shaped member 146 is provided around the heater 62 for pressing the image forming sheet 19 against the body tube member 53. The provision of such frame-shaped member prevents thermal diffusion to the adjoining frames can be prevented even if the temperature of the heater 62 rises unnecessarily high and, combine with pressing of the image forming sheet 19 against the body tube member 53 by the heater 62, achieves double seal so that even when the pressure of the pressurized gas increases, no gas escapes from between the image forming sheet 19 and the body tube member 53, thereby ensuring to perform more uniform heating.

Figure 9B:
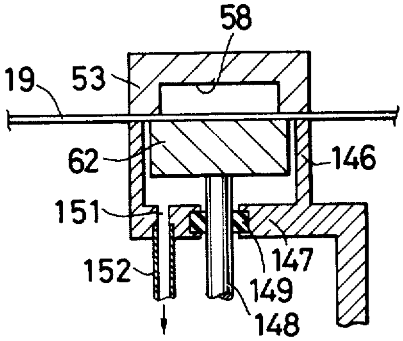
Figure 9C:
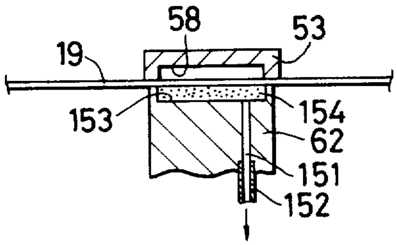

In the foregoing, a positive pressure is applied to the image forming sheet 19 for pressurization, but it is also possible to apply a negative pressure to the sheet 19 from the opposite side to provide the same results as those obtainable with pressurization. FIG. 9B shows, by way of example, an arrangement for such operation, in which the gas inlet port 137 formed in the body tube member 53 to open to the recess 58 in the foregoing is left out, the open end of the second frame-shaped member 146 on the opposite side from the image forming sheet 19 is covered with a plate 147, and a heater driving shaft 148 projects out of the plate 147 through a gas-tight packing 149. A suction port 151 is formed in the plate 147, and air in the second frame-shaped member 146 is sucked through a pipe 152 coupled with the suction port 151. As a consequence, the internal pressure of the second frame-shaped member 146 is rendered negative relative to the external pressure, resulting in the image forming sheet 19 being uniformly urged against the heater 62. In FIG. 9C, since the image forming sheet 19 is attracted to the side of the heater in such a case of applying a negative pressure to the image forming sheet as described above, a recess 153 of substantially the same size as the recess 58 of the body tube member 53 is formed in the surface of the heater 62 on the side of the image forming sheet 19. A porous thermal medium 154 of high thermal conductivity is packed into the recess 153, and a suction port 151 is formed in the heater 62 to open to the recess 153. By sucking air from the suction port 151, the image forming sheet 19 is attracted to the heater 62, and the heat of the heater 62 is transmitted via the thermal medium 154 to the image forming sheet 19. As the thermal medium 154, use can be made of sintered metal of stainless steel or the like. FIGS. 9A to C show heat-development means, but such arrangements can also be applied to the preheating means. Although the above has made reference to the pressurizing means employing a negative pressure, pressurization using a positive pressure is rather practical in terms of resulting picture quality.

Heating or cooling of the image forming sheet can be performed by a heating method of contacting a high-temperature gas with the sheet or exposing the sheet to irradiation by infrared or far infrared rays as well as the above-described method of contacting a high-temperature solid body directly with the image forming sheet. As the method of contacting the high-temperature gas with the image forming sheet, there can be mentioned a method of blowing the high-temperature gas against the image forming sheet, and a method that a high-temperature solid body is disposed in adjacent but spaced relation to the image forming sheet to heat gas present in the very narrow air gap defined between the solid body and the sheet. It is also possible to adopt the combined use of the method utilizing a solid body and the method utilizing gas or infrared rays or the like.

Figure 13:
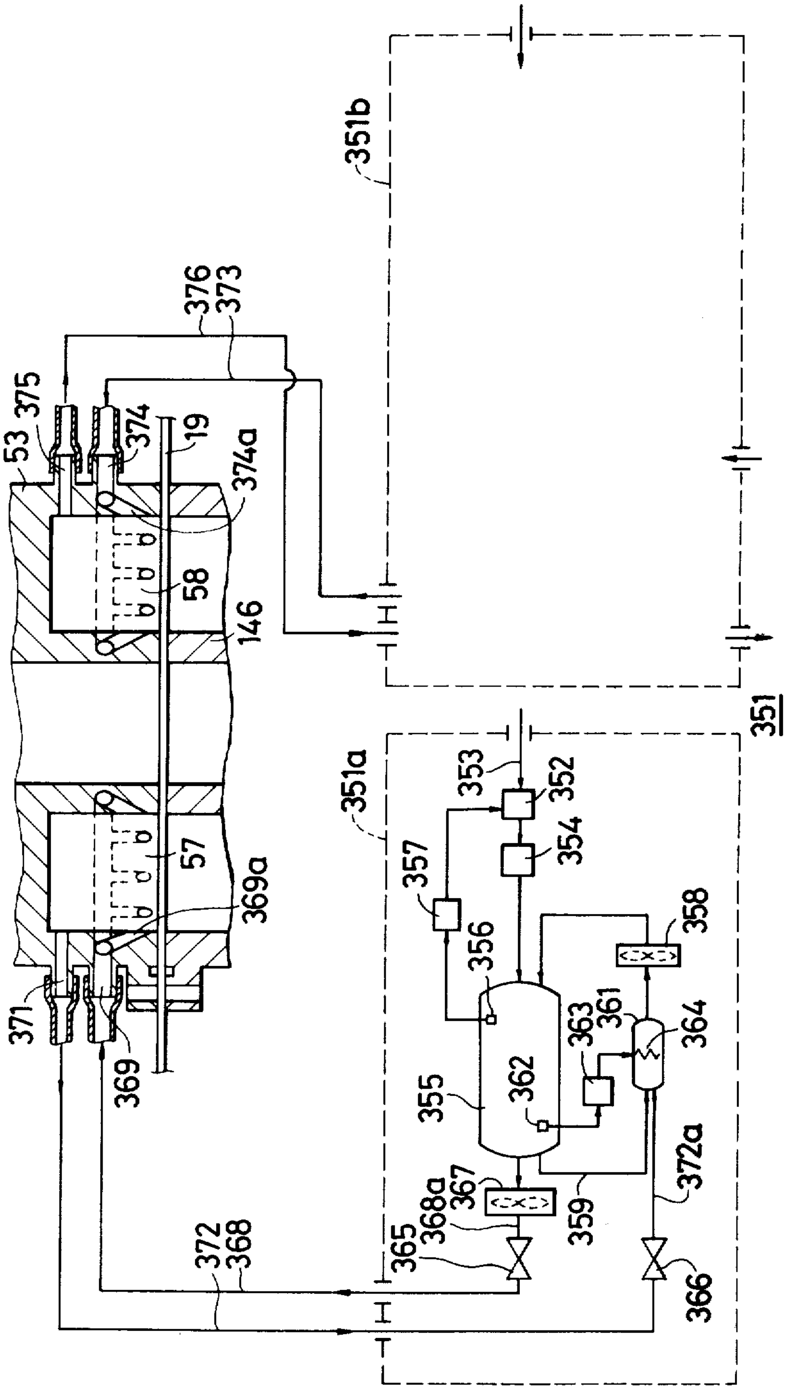
FIG. 13 is a schematic diagram showing control systems and air passages for heating with heated air.

FIG. 13 shows, by way of example, an arrangement for blowing heated air against the image forming sheet to heat. A heated air generator unit 351 is composed of generators **351*a* and 351*b*. In the generator 351*a*, air sucked therein through an air pipe 353 by an air pump 352 is normally sent through a dust collecting filter 354 into a heated air tank 355. In this case, the pump 352 is placed under control of an output part 357 of a switch 356 for detecting the pressure in the air tank 355, so that the pressure in the tank is maintained at a desired value. The air in the tank 355 is always blown by an air blower 358 into an air heating device 361 through an air pipe 359. A heating unit 364 in the heating device 361 is controlled by the output from an output part 363 of a temperature detecting element 362 placed in the tank 355, air heated to a predetermined temperature is circulated from the heating device 361 through the air blower 358 back to the air tank 355. In this manner, the air in the tank 355** is controlled to remain at a predetermined temperature.

When the image forming sheet 19 is heated, it is held between the body tube 53 and the second frame-shaped member 146 in advance.

In the case of preheating the image forming sheet 19, electromagnetic valves 365 and 366 are opened to permit intercommunication between air pipes 368 and 368*a* and between air pipes 372 and 372*a* respectively, and an air blower 367 is driven, so that the heated air in the tank 355 is blown into the recess 57 from a jet 369*a* through the air blower 367, the air pipe 368*a*, the electromagnetic valve 365, the air pipe 368 and the air inlet port 369, thus preheating the image forming sheet 19. Then, the air thus blown into the recess 57 is returned therefrom to the tank 355 through an air outlet port 371, the air pipe 372, the electromagnetic valve 366, the air pipe 372*a*, the heating device 361 and the air blower 358.

By blowing such heated circulating air against the image forming sheet 19 from the jet 369*a*, the image forming sheet 19 is heat-activated to be rendered photosensitive.

The generator 351*b* of the heated air generator unit 351 is identical in construction with the generator 351*a* described above. Heated air from the generator 351*b* passes through an air pipe 373 and an air inlet port 374 and spouts into the recess 58 to heat the image forming sheet 19, thereafter returning to the generator 351*b* through an air outlet port 375 and an air pipe 376. In the manner described just above, the heated, circulating air from the generator 351*b* is blown against the image forming sheet 19 from the jet 374*a*, resulting in the image forming sheet 19 being heat-developed.

Figure 14:
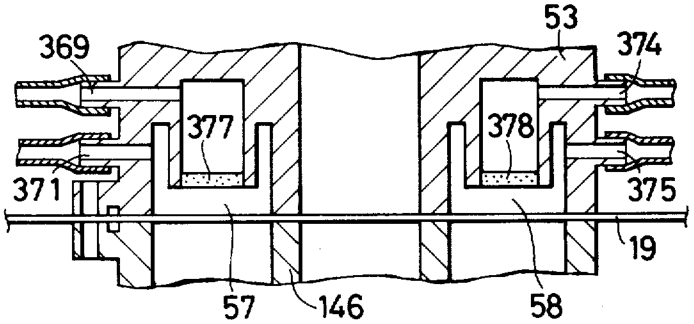
FIG. 14 is a cross-sectional view illustrating another example of the body tube member in the case of heating with heated air.

The temperature of the heated air produced by the generator 351*a* is usually controlled to remain a predetermined value within the range of 80° to 200° C. which is a little higher than the temperature to which the image forming sheet 19 is to be heated. Similarly, the temperature of the heated air produced by the generator 351*b* is usually retained at a predetermined value within the range from 100° to 220° C. Also it is possible to adopt such an arrangement as shown in FIG. 14 in which the heated air having passed through the inlet ports 369 and 374 are respectively blown out into the recesses 57 and 58 through distributing plates 377 and 378 made of a porous material. Further, the heated air may also be blown against the image forming sheet 19 on the opposite side from the body tube member 53. In such a case, frame shaped members are provided in opposing relation to the recesses 57 and 58 across the image forming sheet 19, and heated air is sent into the frame-shaped members and blown against the image forming sheet, if necessary, through distributing plates.

Figure 15:
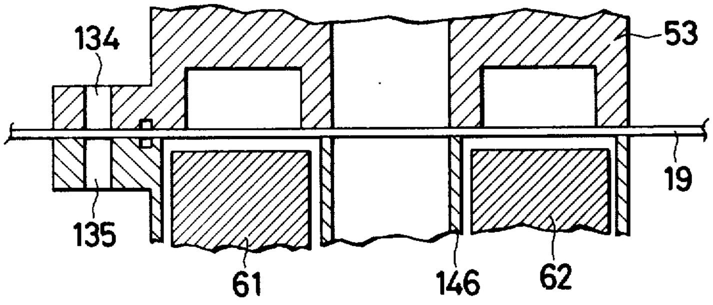
FIG. 15 is a cross-sectional view illustrating another example of the body tube member in the case of heating with gas.

FIG. 15 illustrates a modified form of the arrangement for heating the image forming sheet 19 by contacting therewith a gas. In FIG. 15, high-temperature solid bodies are brought as close to the image forming sheet 19 as possible but not moved into contact therewith. The image forming sheet 19 is held between the body tube member 53 and the second frame-shaped member 46, and during operation the heaters 61 and 62 are brought into close proximity with the image forming sheet 19 to heat it. It is believed that heating of the sheet 19 is performed by a combination of conduction, convection and radiation.

Figure 16:
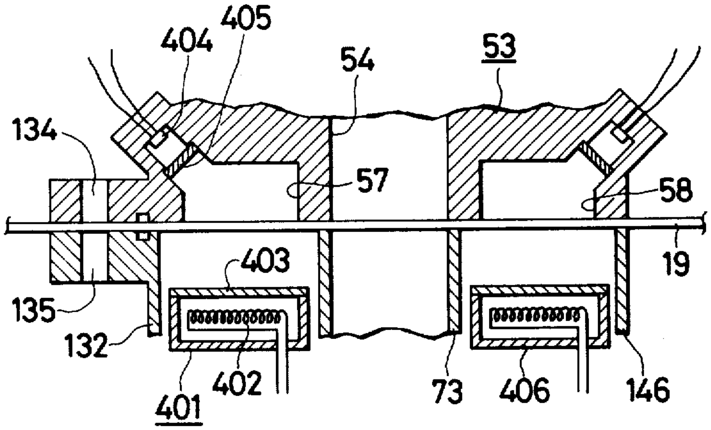
FIG. 16 is a cross-sectional view showing another example of the body tube member in the case of heating with infrared rays.

As the heating means, infrared or far infrared rays can also be employed. For example, as depicted in FIG. 16, second frame-shaped members 132 and 146 are respectively disposed opposite the recesses 57 and 58 of the body tube member 53 across the image forming sheet 19. The second frame-shaped members 132 and 146 have disposed therein infrared ray generators 401 and 406 respectively. The infrared ray generator 401 comprises, for example, a heater 402 incorporated therein and an infrared radiation member 403 as of lanthanum, chromite or the like which is disposed on the side of the image forming sheet 19. Upon energization of the heater 402, infrared rays are radiated to irradiate the image forming sheet 19 to heat it. In the recess 57, an infrared ray detector 404 is provided, which detects infrared rays from the image forming sheet 19 to detect its temperature. In such an instance, a filter 405 may also be provided for intercepting wavelength components of infrared rays which are not absorbed by the image forming sheet 19, that is, the wavelength components of infrared rays unnecessary for heating the sheet 19, thereby to ensure detection of only the component having heated the sheet 19. The other infrared ray generator 406 may be identical in construction with the above-described one 401. The second frame-shaped members 132 and 146 can be formed as a unitary structure with the second frame-shaped member 73 positioned opposite the through hole 54 of the body tube member 53.

In the case where a solid body for heating use is not brought into direct contact with the image forming sheet like the heating means shown in FIGS. 15 and 16, no deformation of the sheet is caused by the direct contact therewith of the solid body, and the surface of the solid body on the side of the image forming sheet need not be made smooth.

The above has illustrated the heating and the cooling means. As the first heating means for preheating use and the second heating means for heat-developing use, different types of heating means can be employed, but it is preferred in terms of design to employ heating means of the same kind; in general, it is preferred to employ the heating means of the type contacting a heating solid body with the image forming sheet. The embodiment illustrated in FIGS. 1 to 3 is designed so that information recorded in the frame of the image forming sheet 19 placed at the exposure position is projected on an enlarged scale for reading. To this end, a light source box 161 is mounted on the base plate 22 below the second frame shaped member 73 for exposure use in FIG. 2, for instance. In the light source box 161 there is provided a light source 162 for reading, and, as required, a cooling fan 163 is disposed on the side of the base plate 22. Rays of light from the light source 162 are condensed by a concave mirror 164 and directed to a reflector 165 in parallel relation to the base plate 22 and then turned thereby to the side of the exposure position. The optical axis of the light thus turned at right angles is aligned with the aixs of the second frame-shaped member 37 and the through hole 53. Above the reflector 165 is provided a condensing lens 166, and the light condensed by the lens 166 passes through the frame-shaped member 73 and irradiates that area of the image forming sheet 19 which underlies the through hole 54. The transmitted light from the image forming sheet 19 passes through the projecting lens 18 and is guided to the side of the reflector 125.

Figure 10:
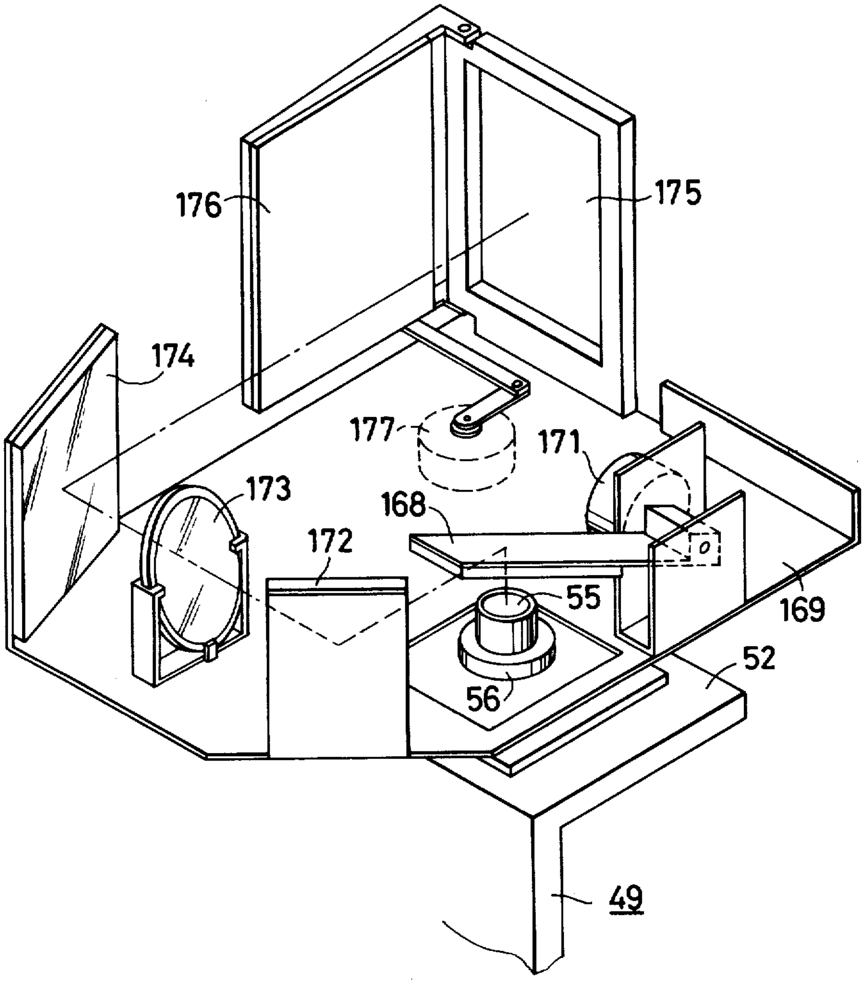
FIG. 10 is a perspective view showing means for forming an optical path for reading use.

Between the shutter 129 and the body tube member 53 is provided a rotary mirror 168 which can be moved into or out of the optical path of the image of a subject, as shown in FIG. 10. The rotary mirror 168 is pivotally mounted on a mounting plate 169 fixed to the front panel 15 of the housing 12. The rotary shaft of the rotary mirror 168 is driven by a solenoid 171. During recording the rotary mirror 168 is held away from the optical path between the reflector 125 and the body tube member 53, as indicated by the solid lines in FIG. 2. During reading the rotary mirror 168 is turned to be inserted in the abovesaid optical path at an angle with respect thereto, as indicated by the chain lines in FIG. 2. Accordingly, the light having passed through the body tube member 53 is reflected by the rotary mirror 168 and further reflected by a reflector 172 mounted on the mounting plate 169, passing substantially in parallel with the front panel 15, and enlarged by an enlarging projecting lens 173, thereafter being bent by a reflector 174 substantially at right angles to be projected on the screen 175 provided on the front panel 15 of the housing 12. During recording the screen 175 is covered with a cover plate 176 so that no unnecessary light enters from the screen 175. During reading the cover plate 176 is removed by the control of a solenoid 177, and a recorded image in the image forming area positioned right under the through hole 54 is projected onto the screen 175 on an enlarged scale.

There is a difference between the optical path from the subject holding part 13 to the image forming sheet 19 and the optical path from the image forming sheet 19 to the screen 175. In such a case as described above, the record on the image forming sheet 19 is clearly projected by the enlarging projecting screen 173 onto the screen 175 on an enlarged scale. The screen 175 need not always be provided on the front panel 15 but may also be disposed at any other convenient location. At any rate, by incorporating the enlarging projecting lens 173 in the optical path for enlarged projection use, information recorded in an arbitrarily selected one of frames on the image forming sheet 19 can be projected on an enlarged scale without transferring the image forming sheet 19 to a position different from that for photographing, or without mounting the image forming sheet 19 on a separate projector. Therefore, during recording information can be read immediately after being recorded. In order to ensure that during reading one frame of the image forming sheet 19 assumes a right position, the image forming sheet 19 is pressed by the second frame-shaped member 73 against the marginal portion of the through hole 54 of the body tube member 53.

As will be understood from the above, the addition of the enlarged projection means requires at least a light source, a condensing lens (or mirror) and a screen, and the other elements can be dispensed with as required.

A unit for controlling transfer, heating and exposure of the image forming sheet 19, application of a fluid pressure to the sheet 19 and so forth is disposed in a casing 205 placed in the housing 12 at the left-hand side, as viewed in FIG. 3. The abovesaid control is performed using the so-called microcomputer, for example. Temperature control for the heaters 61 and 62 is also achieved by the microcomputer.

Figure 17:
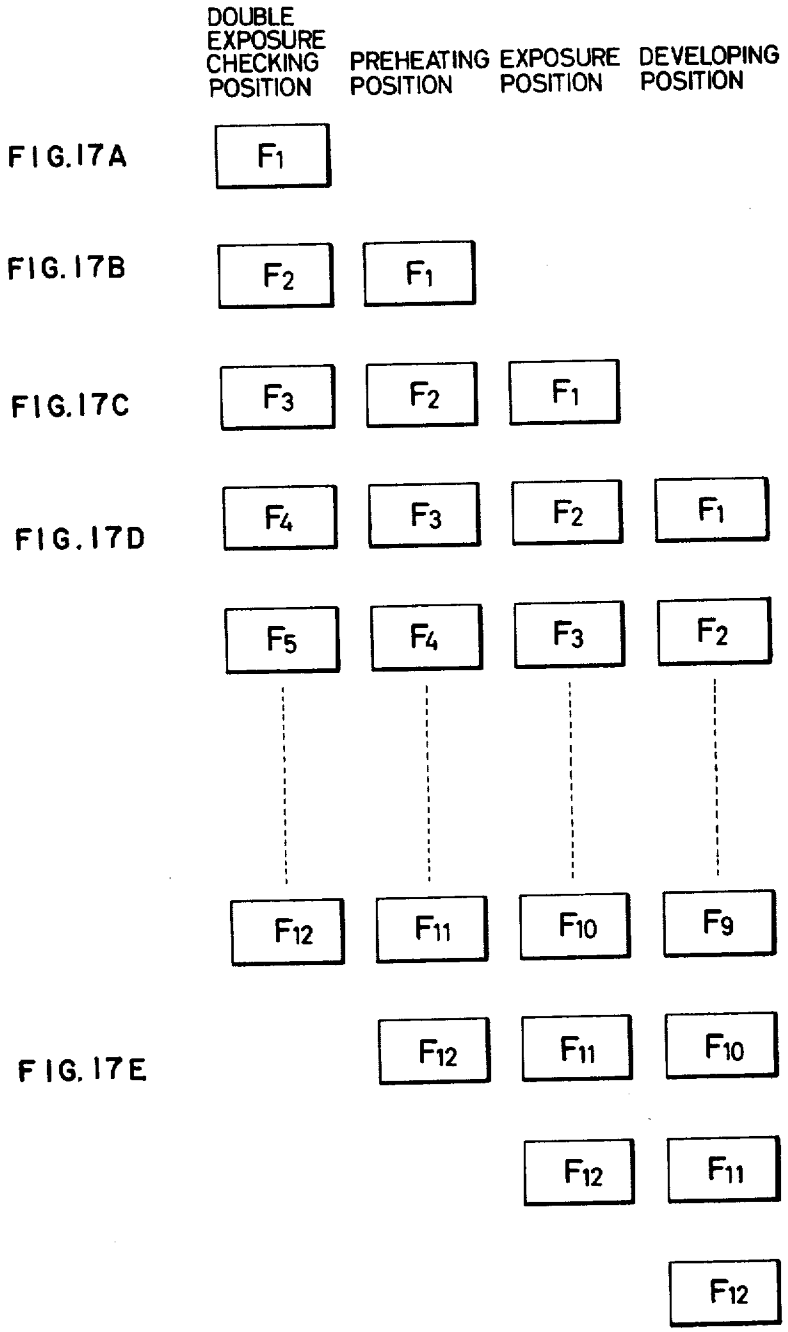
FIG. 17 is a diagram showing the relationships between frames of the image forming sheet and a double exposure checking, a preheating, an exposure and a heat-development position during successive recording.

In the case where the double image formation preventive means, the preheating means, the exposure means and the heat-development means are aligned at the same intervals as those of the image forming areas of the image forming sheet 19, it is possible not only to perform recording on one image forming area of the sheet 19 by successively subjecting it to the respective processes but also to achieve higher-speed recording by simultaneously subjecting a plurality of image forming areas to any one of the respective steps. In the latter case, when a first designated frame $F_1$ is brought to a double exposure checking position, as shown in FIG. 17A, it is checked whether the frame $F_1$ is an already recorded one or not. If not, the image forming sheet is moved by one frame in the X-axis direction to bring the designated frame $F_1$ to the preheating position, as depicted in FIG. 17B. While the frame $F_1$ is preheated, the next frame $F_2$ is checked for double exposure at the same time. Where there is no fear of double exposure of the frame $F_2$, the image forming sheet is moved by one frame in the X-axis direction, bringing the frames $F_1$ and $F_2$ to the exposure position, and the preheating position respectively, and the next frame $F_3$ to the double exposure checking position, as shown in FIG. 17C. The frames $F_1$ and $F_2$ are simultaneously subjected to the exposure and the preheating process respectively, and at the same time the frame $F_4$ is subjected to the double exposure checking process. If the frame $F_4$ is found to be unrecorded, the image forming sheet is further shifted by one frame in the X-axis direction to provide such a state as shown in FIG. 17D, in which the first frame $F_1$ lies at the developing position, the second frame $F_1$ lies at the developing position, the second frame $F_2$ at the exposure position, the third frame $F_3$ at the preheating position and the next frame $F_4$ at the double exposure checking position. The frames $F_1$, $F_2$ and $F_3$ are simultaneously subjected to the development, the exposure and the preheating process respectively, and at the same time the frame $F_4$ is subjected to the double exposure checking process. Thereafter, each time the image forming sheet is similarly shifted by one frame in the X-aixs direction, four frames are respectively checked for double exposure, preheated, exposed, and heat-developed substantially at the same time. In the case of completing such successive recording, when a last frame $F_{12}$ is brought to the preheating position, the preheating, exposure, and the development process take place in parallel, but no double exposure checking process is performed, as shown in FIG. 12E. Then, the image forming sheet is moved by one frame in the X-axis direction, the exposure and the development process take place in parallel; thereafter the frames still in the course of recording are similarly subjected to the remaining processes one after another.

The conditions for recording in the foregoing embodiments are as follows: The preheating is conducted at a temperature in the range of 80° to 130° C. for a suitable time between 0.5 and 12 sec.; the exposure after rendering the image forming sheet photosensitive is performed under illumination of, for example, 2000 to 10000 luxes for about 0.5 to 12 sec. or so; and the heat-development is effected at a temperature of, for example, 100° to 150° C. or so for a suitable time in the range of 0.5 to 12 sec.

Figure 18:
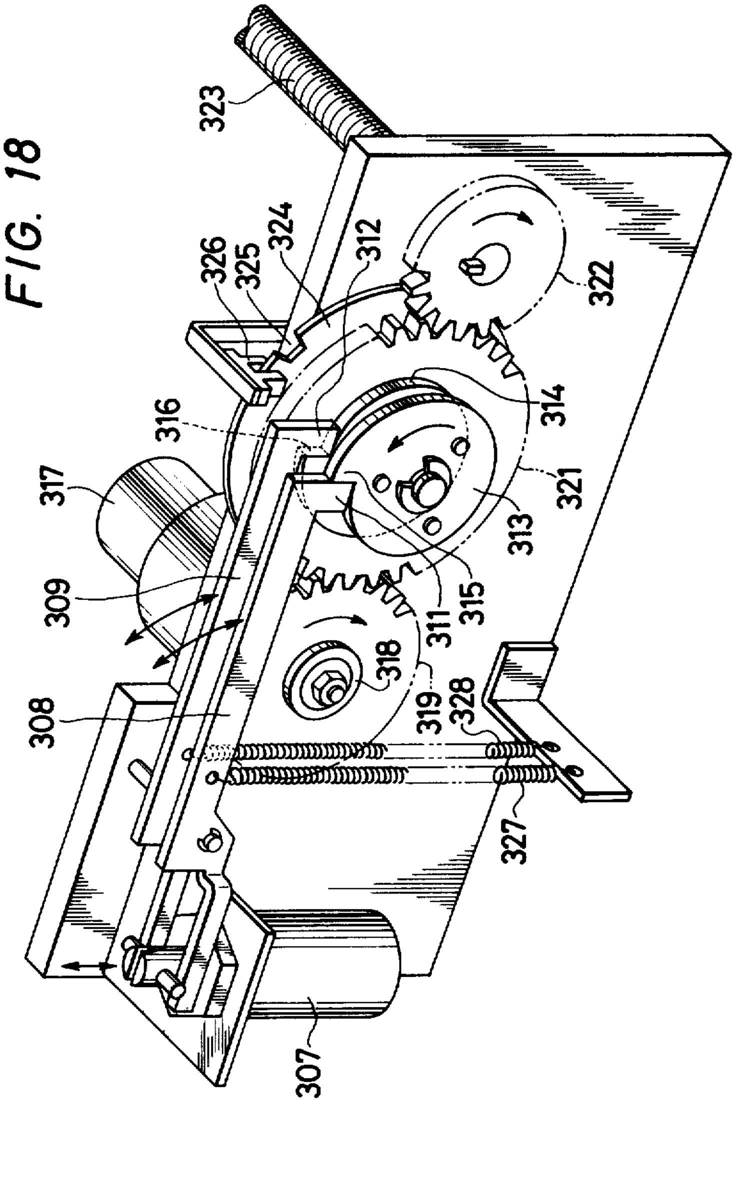
FIG. 18 is a perspective view illustrating an example of utilizing ratchet wheels for positioning of the image forming sheet.

In the above, a step motor is employed for driving, positioning and stopping of the image forming sheet transfer means, but other methods may also be employed. For example, as described hereunder, use can also be made of transfer means which is driven by an ordinary motor, positioned by a signal produced by a combination of an encoder and a photo sensor, and stopped by a latch. That is, as shown in FIG. 18, claws 311 and 312 of a forward revolving bar 308 and a backward revolving bar 309 are respectively disengaged from latches 315 and 316 of a forward revolving ratchet wheel 313 and a backward revolving ratchet wheel 314 by the action of a solenoid 307. Next, a motor 317 is driven to drive a rotary shaft 323 through a clutch 318 and gears 319, 321 and 322. An encoder 324, the gear 321 and the ratch wheels 313 and 314 are fixed relative and formed as a unitary structure with one another and designed so that upon each rotation, the drive shaft 323 is driven corresponding to the distance of movement of the image forming sheet for one frame. When the gear 321 rotates by half, a notch 325 of the encoder 324 is detected by a photo sensor 326. This detection signal deenergizes the solenoid 307, and by the action of springs 327 and 328 the claws 311 and 312 slide on the outer peripheral surfaces of the ratchet wheels 313 and 314 respectively. With further rotation of the motor 317, the latch 317 of the ratchet wheel 313 strikes against due claw 311 of the bar 308, and at the same time the claw 312 of the bar 309 strikes against the latch 316 of the ratchet wheel 314, preventing reversal of the gear 321 due to repulsion of the shock. At the same time, the rotary drive shaft 323 is stopped from rotating. The motor 317 is timed to such an extent as to continue rotating for a while even after the gear 321 is stopped by the aforementioned detection signal from the photo sensor 326, and in this while over loading of the motor 317 is prevented by the clutch 318 until the motor 317 comes to rest after stopping of the gear 321. In this manner, the image forming sheet can be shifted and positioned with high accuracy; therefore, such a transfer mechanism as described above may also be employed.

Although the foregoing embodiments utilize the threaded shafts 33, 43 and 323 for shifting the image forming sheet, it is also possible to adopt a method using wires, a method using a rack and a pinion or a method using a chain. Of these methods, a method of moving the image forming sheet in two dimensions of the X and Y directions is effective when the image forming sheet is a microfiche.

In the apparatus shown in FIGS. 4 and 5, the heater 61 for preheating, the heater 61 for development and the second frame-shaped member 73 for exposure are brought into and out of contact with the image forming sheet, but it is also possible to fix them and move the body tube member 53 into and out of contact with the image forming sheet. Generally, it is desirable to adopt such an arrangement as shown in FIG. 2 in which the side of the body tube member 53 is fixed and the heaters and the second frame-shaped member for exposure are made movable so that the image forming position for the image of a subject can easily be fixed. Moreover, the illustrated mechanism for bringing the heaters and so on into and out of contact with the image forming sheet is suitable for use in practice, but this mechanism may also be replaced with others. Also, the exposure means may be substituted with other means than the aforementioned, but at least a projecting leans for projecting the image of the subject onto the image forming sheet and a shutter are needed, and the other elements can be modified according to the position of the subject being placed; for example, the subject may also be placed on the top of the housing to face downwards. Further, the conditions for exposure can be changed as by presetting a predetermined exposure time without using an automatic exposure detector.

As has been described in the foregoing, with the heat-developable image forming apparatus of this invention, an image can be recorded and developed on the image forming sheet frame by frame without the necessity of providing a dark room for handling a raw image forming sheet, and the recorded image forming sheet can be preserved for subsequent reproduction of the record and, if necessary, can be loaded again on the image forming apparatus for newly recording on an unrecorded frame of the sheet. Since no dark room is required and since development is not wet-type, no developer is used; consequently, the image forming apparatus is very simple in structure, and the image forming sheet can be preserved after being subjected to recording in one or some frames only and, if necessary, can be subjected to additional recording in other frames.

By independently providing the first heating means, the exposure means and the second heating means in a manner to have one-to-one correspondence to the image forming areas of the image forming sheet and by arranging these means corresponding to a plurality of image forming areas (preferably a plurality of successive image forming areas), the image forming sheet is always moved a constant distance in the direction of arrangement of the abovesaid means for each step, and if necessary, processings by two or more of the first heating means, the exposure means and the second heating means can be simultaneously performed in parallel, so that high-speed image forming operation is possible. The processing speed can be further increased by providing double image formation preventive mens in addition to the abovesaid three means.

In the present invention, since fixing means are respectively provided for the first heating means the second heating means and the exposure means, thermal deformation of the image forming area during heating can be prevented, so that the entire image forming area can uniformly be heated to ensure uniform sensitivity over the entire area, providing for for enhanced resolution. Further, the fixing means prevents heat conduction from the image forming area being fixed thereby to the adjoining image forming area; therefore, the image forming areas can be disposed in close proximity. Moreover, by fixing the image forming area during exposure, the image forming area can be placed at the position where the image of a subject is formed. During heating using solid-body heating means the image forming area is pressed thereagainst by a pressurizing fluid; this ensures uniform heating of the entire image forming area and prevents thermal deformation of the image forming sheet. These features serve to enhance resolution in the case of producing an enlarged display of a record made on an reduced scale.

It will be apparent that many modifications and variations may be effected without departing from the scope of the novel concepts of this invention.

What is claimed is:

1. Image forming apparatus for forming an image using a heat-developable image forming sheet that is normally non-photosensitive but can be rendered photosensitive by preheating prior to exposure and exposed to a light image to form therein a latent image and then heat-developed to produce a visible image, comprising:

first heating means for preheating one image forming area of the image forming sheet;

exposure means for projecting an optical image of a subject to the preheated image forming area;

second heating means for heat-developing the exposed image forming area; and transfer means for transferring the image forming sheet to the first heating means, the exposure means and the second heating means;

wherein the first heating means, the exposure means and the second heating means are each provided with fixing means for fixing the image forming area of the image forming sheet at the processing position of each means, and wherein the first heating means, the exposure means and the second heating means are arranged so that individual image forming areas of the image forming sheet can be simultaneously processed by the respective means in parallel.

2. Image forming apparatus according to claim 1, wherein the first heating means, the exposure means and the second heating means are arranged in alignment, and wherein the exposure means is disposed between the first and second heating means.

3. Image forming apparatus according to claim 1, wherein at least one of the fixing means has one at least one frame-shaped member for holding the image forming sheet surrounding the corresponding image forming area.

4. Image forming apparatus according to claim 1, wherein at least one of the fixing means comprises a pair of opposing first and second frame-shaped members for holding therebetween the image forming sheet surrounding the corresponding image forming area.

5. Image forming apparatus according to claim 3, wherein the exposure means includes a body tube member, and wherein the end face of the body tube member on the side of the image forming sheet is frame-shaped to form at least one part of the fixing means for the exposure means.

6. Image forming apparatus according to claim 5, wherein the fixing means comprises another frame-shaped member provided in opposing relation to the end face of the body tube member so that during exposure the image forming sheet can be held between the end face of the body tube member and the end face of the frame-shaped member surrounding the image forming area of the image forming sheet.

7. Image forming apparatus according to claim 6, wherein there are provided means for directing projection light through the inside of said another frame-shaped member to one image forming area of the image forming sheet and means for projecting to a screen projection light having transmitted through the image forming area and passed through a through hole of the body tube member.

8. Image forming apparatus according to claim 5, wherein frame-shaped members of the fixing means for the first heating means and the second heating means are respectively fixed to the body tube member on both sides thereof.

9. Image forming apparatus according to claim 1, wherein at least one of the first and second heating means has a high-temperature solid body which makes direct contact with one image forming area of the image forming sheet for heating.

10. Image forming apparatus according to claim 9, wherein the high-temperature solid body is heat conductor having incorporated therein a heater, and wherein its temperature is controlled at a predetermined value.

11. Image forming apparatus according to claim 9, wherein means if provided for applying a pressurizing fluid to the image forming sheet on the opposite side from the side on which the image forming sheet contacts the high-temperatures solid body when the latter is held in direct contact with the former.

12. Image forming apparatus according to claim 9, wherein the pressurizing fluid is pressurized air.

13. Image forming apparatus according to claim 11, wherein a frame-shaped member is disposed on the opposite side from the side on which the high-temperature solid body is held in direct contact with the image forming sheet, and wherein the pressurizing fluid is introduced from the outside into the frame-shaped member and applied to the image forming sheet on its surface contacting the frame-shaped member.

14. Image forming apparatus according to claim 9, wherein means is provided for producing a negative pressure between the high-temperature solid body and the image forming sheet contacting therewith when the former is held in direct contact with the latter.

15. Image forming apparatus according to claim 1, wherein at least one of the first and second heating means heats the image forming area of the image forming sheet by contacting therewith a high-temperature gas.

16. Image forming apparatus according to claim 15, wherein the high-temperature gas is air heated by a heater up to 80° to 220° C.

17. Image forming aparatus according to claim 15, wherein the high-temperature gas is air which is present between the image forming sheet and a high-temperature solid body disposed in adjacent but spaced relation thereto and is heated by the high-temperature solid body.

18. Image forming apparatus according to claim 1, wherein at least one of the first and second heating means is means for emitting infrared or far infrared rays.

19. Image forming apparatus according to claim 11, wherein checking means is provided for preventing double image formation on an already recorded image forming area of the image forming sheet.

20. Image forming apparatus according to claim 19, wherein the checking means includes a light emitting device and a photo detector, wherein light emitted from the light emitting device and transmitted through or reflected by the image forming sheet is detected in terms of intensity of the output from the photo detector, and wherein double image formation is checked by a comparison of the intensity of the photo detector output with a preset value.

21. Image forming apparatus according to claim 20, wherein when the image of the subject is formed on the image forming area of the image forming sheet, a strip-like mark different in reflection factor from the image forming sheet is formed along at least one of all four sides of the image forming area, and wherein the mark is detected by the checking means.

* * * * *